O. TALLAKSEN.
REFRIGERATOR.
APPLICATION FILED SEPT. 16, 1918.

1,291,246.

Patented Jan. 14, 1919.
4 SHEETS—SHEET 1.

Inventor
Olaf Tallaksen
Attorney

O. TALLAKSEN.
REFRIGERATOR.
APPLICATION FILED SEPT. 16, 1918.

1,291,246.

Patented Jan. 14, 1919.
4 SHEETS—SHEET 2.

Inventor
Olaf Tallaksen,
By
Attorney

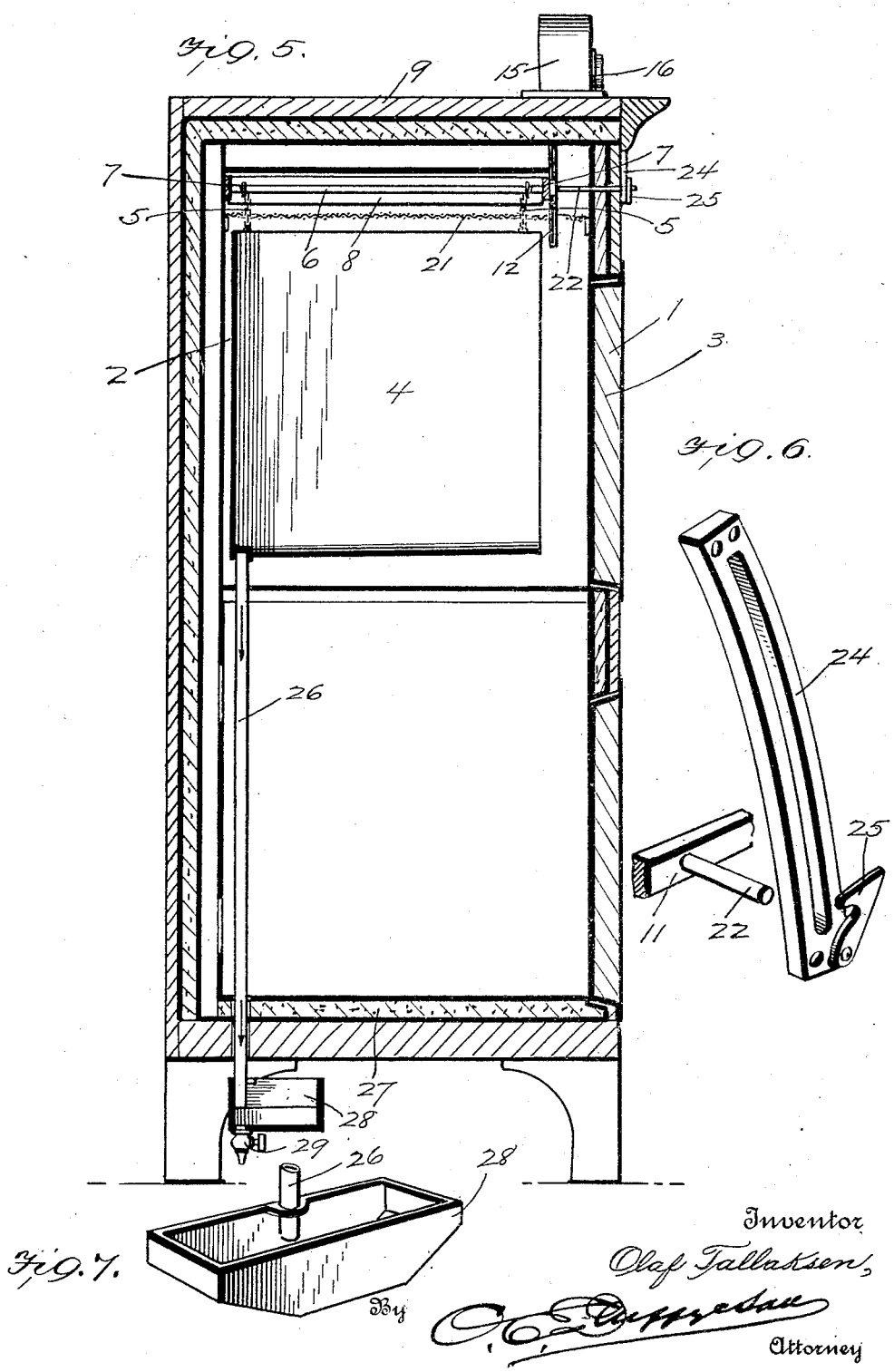

O. TALLAKSEN.
REFRIGERATOR.
APPLICATION FILED SEPT. 16, 1918.

1,291,246.

Patented Jan. 14, 1919.
4 SHEETS—SHEET 4.

Inventor
Olaf Tallaksen
By
Attorney

UNITED STATES PATENT OFFICE.

OLAF TALLAKSEN, OF WASHINGTON, DISTRICT OF COLUMBIA.

REFRIGERATOR.

1,291,246.

Specification of Letters Patent. Patented Jan. 14, 1919.

Application filed September 16, 1918. Serial No. 254,292.

*To all whom it may concern:*

Be it known that I, OLAF TALLAKSEN, subject of the King of Norway, residing at Washington, in the District of Columbia, have invented certain new and useful Improvements in Refrigerators, and do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to refrigerators, but more particularly to a construction for weighing and indicating the weight of ice delivered thereto, in such manner that a correct check may be made and kept on the quantity or weight of ice delivered by the ice dealer, to the end that no mistake either accidental or intentional can be made in the weight of ice delivered to the refrigerator, and all possibility of short weight or overcharge is effectually prevented.

The invention has for a further object to provide a construction which will permit of an accurate determination at some subsequent time, of the weight of ice delivered to the refrigerator, even after the ice had been partially or wholly melted.

With these and other objects in view, the invention consists in the novel weighing apparatus which obviously may be employed for any purpose.

The invention further consists in the novel construction of the ice-receiving compartment and in the weighing and indicating mechanism.

The invention further consists in the novel construction for collecting and weighing the water dripped from the ice in such manner that the indicated weight is the same when the ice is wholly or partially melted, as when the ice was initially delivered to the refrigerator.

The invention further consists in the novel construction of the weight indicating refrigerator or ice box.

The invention further consists in certain novel details of construction and in combinations of parts, all of which will be first fully described and afterward specifically pointed out in the appended claims.

Referring to the accompanying drawings:

Fig. 5 is a vertical transverse sectional view particularly illustrating the drip or drain.

Fig. 6 is an enlarged perspective view of the latching mechanism.

Fig. 7 is a perspective view of the drip receptacle.

Like numerals of reference indicate the same parts throughout the several figures, in which:

Figure 1:
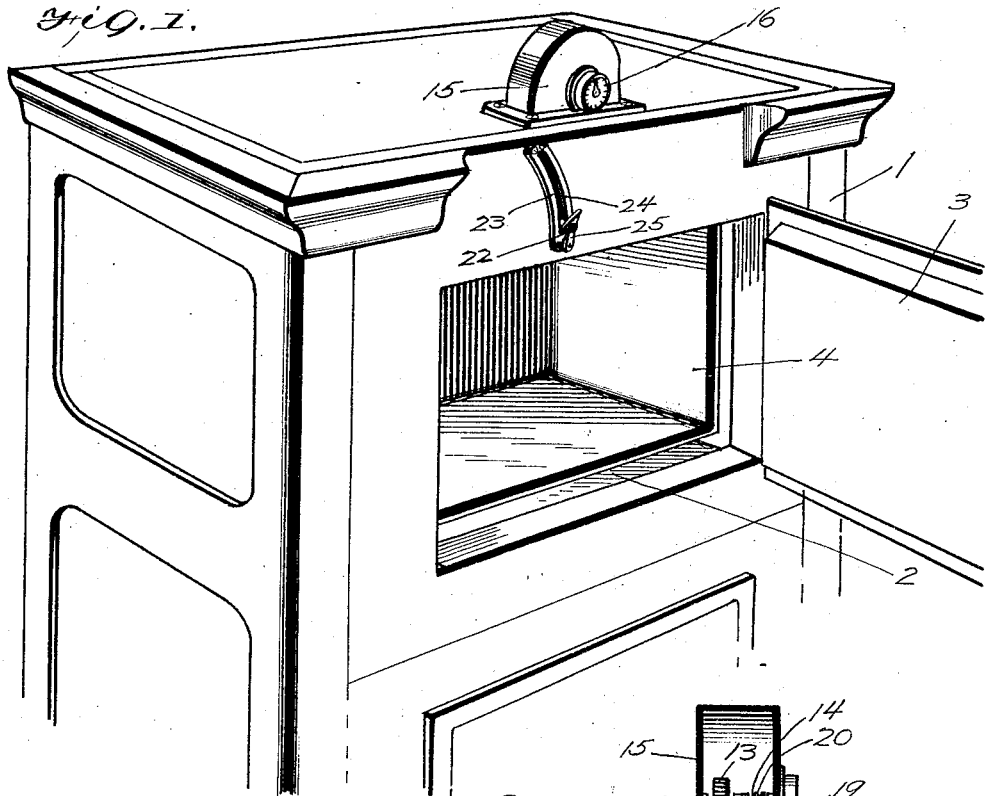
Figure 1 is a perspective view of a refrigerator constructed in accordance with this invention.
Figure 8:
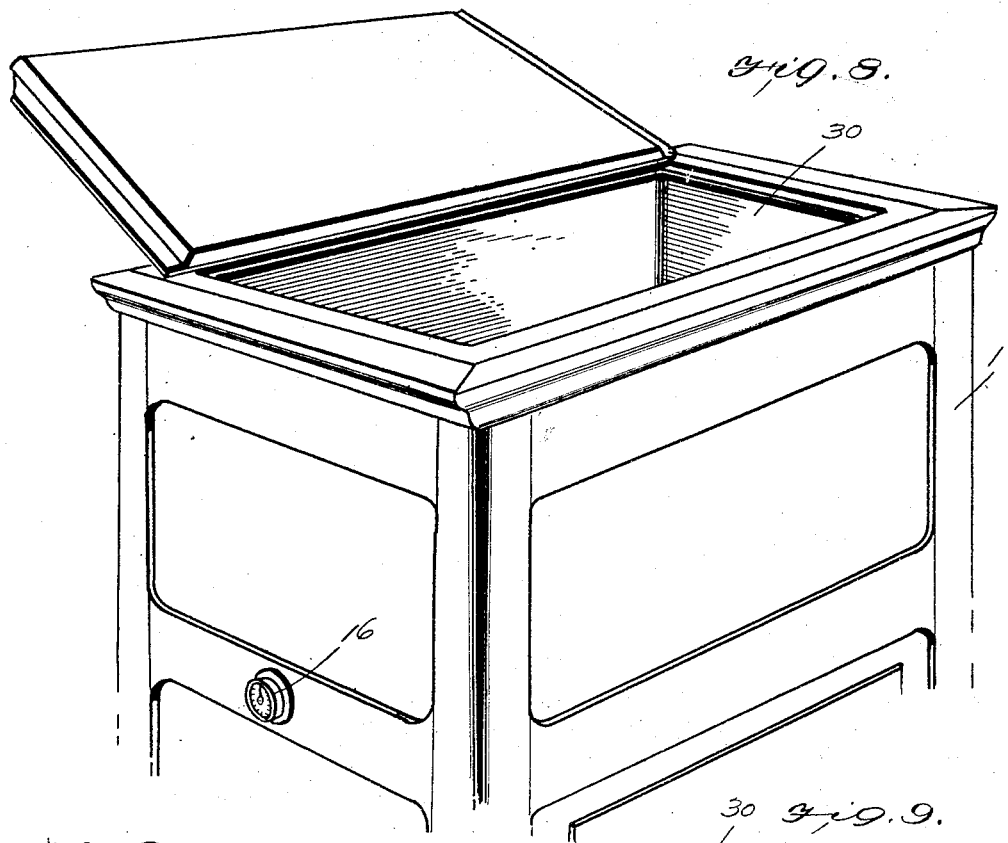
Fig. 8 is a perspective view of an ice-box equipped with this invention.
Figure 9:
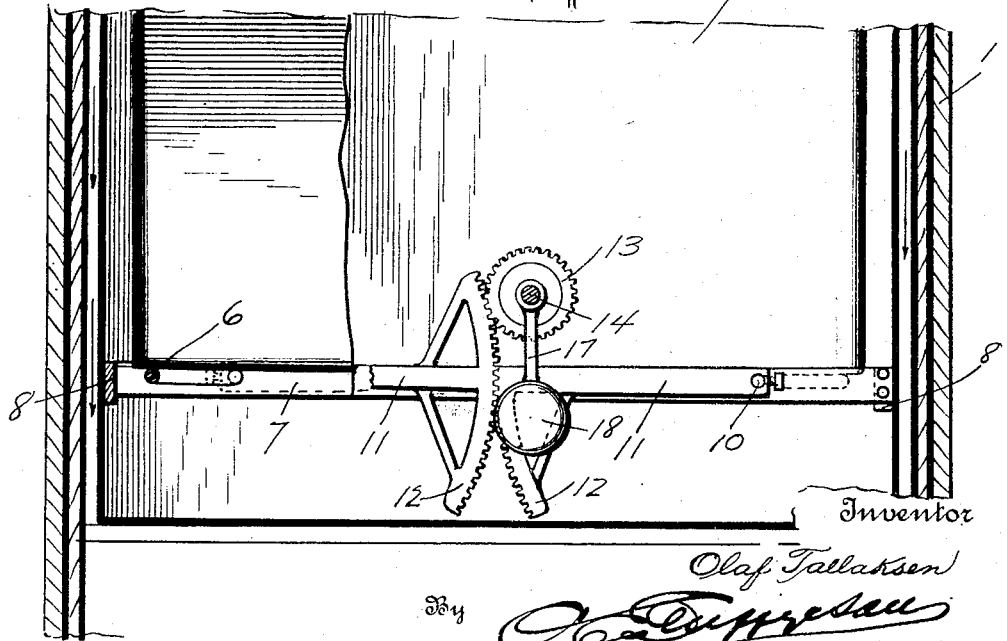
Fig. 9 is a vertical transverse sectional view through such ice-box illustrating the weighing mechanism.

1 indicates a refrigerator as shown in Fig. 1, or an ice-box as shown in Fig. 8. In the former the ice compartment 2, is provided with the usual door 3, while the metal lining or receptacle 4 is suspended at its two ends on short chains 5 (Fig. 2) on oppositely disposed crank-shafts 6 (Fig. 4) said shafts being mounted in front and rear longitudinal frame pieces 7 as shown in Fig. 4, and in dotted lines in Fig. 3. The frame pieces 7 are connected at their ends by transverse frame pieces 8 to provide a strong, rigid construction, the frame being permanently secured close under or in the top 9 of the refrigerator as shown in Fig. 3, or located close to or in the bottom of the ice-box as shown in Fig. 9.

Figure 2:
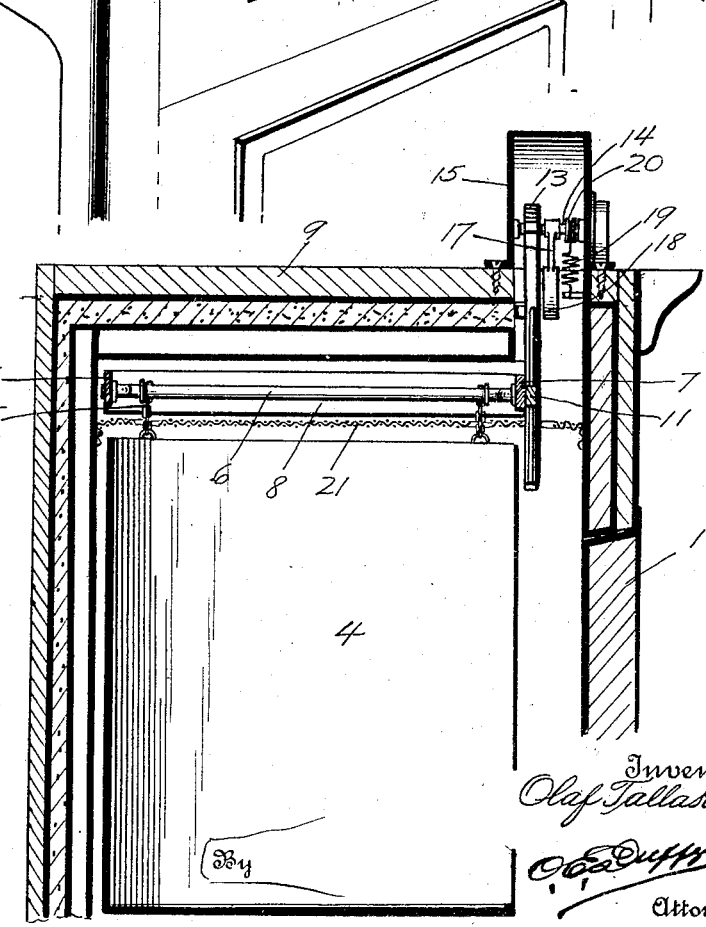
Fig. 2 is a vertical transverse sectional view through the same.
Figure 3:
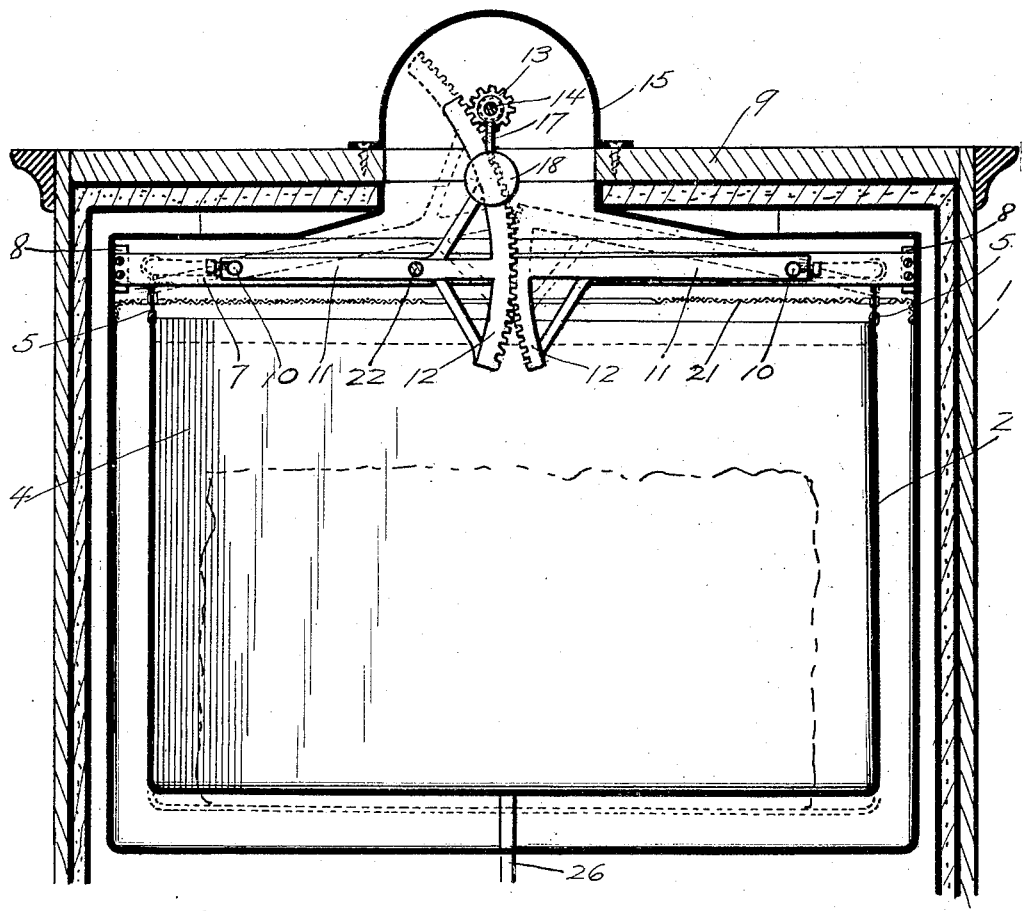
Fig. 3 is a vertical longitudinal sectional view.
Figure 4:
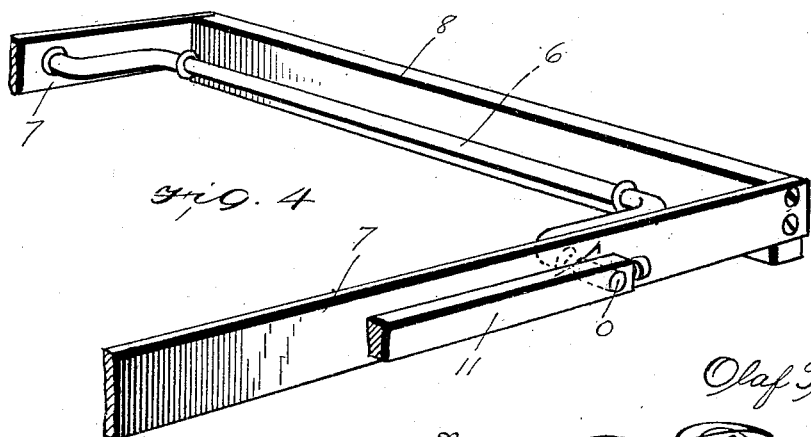
Fig. 4 is an enlarged fragmentary perspective view of the frame and one crank shaft of the weighing mechanism.

Each of the crank shafts 6 has one of its ends 10 connected to a substantially horizontal arm 11, (Figs. 3 and 4) said arms approaching each other, and being each provided with a toothed segment 12 meshing together, one of said segments 12 extending on a true arc considerably above the other segment 12 so as to mesh with a pinion 13 fixed on a horizontal shaft 14 mounted in a housing 15 on top of the refrigerator as shown in Figs. 2 and 3. The shaft 14 extends through the front of the housing 15 and has thereon a dial-hand movable over the face of a dial 16, Fig. 1, so that the movement of the arms 11 will be indicated by the hand on the dial 16; that is to say, the weight of the ice in the compartment 2 acting on the crank shafts 6 rocks said shafts and moves said arms 11 in the manner indicated in dotted lines in Fig. 3, thus rotating the pinion 13 through the medium of the toothed segments 12.

Fixed on the shaft 14 is a depending arm 17 (Figs. 2 and 3) carrying a weight or counterpoise 18, and connected to said shaft 14, is a small spiral spring 19 passing over a grooved collar 20 on the shaft 14, the purpose of said spring 19 being to exert a rotating action on the shaft 14 to normally return the said shaft and dial-hand to their initial zero positions.

Directly under the weighing mechanism, I prefer to provide a horizontal layer 21 of fabric (Figs. 2 and 3), so as to protect the mechanism from the influence of the ice as far as possible.

Arranged on one of the arms 11 (Figs. 3 and 6), is a horizontal pin 22 extending through an arced slot 23 (Fig. 1) in the front of the refrigerator, while a complementally slotted plate 24 (Figs. 1 and 6), is fastened on the front, through which plate said pin 22 extends, a pivoted latch member 25 being provided as shown to engage said pin 22 to hold the arms 11 and their associated mechanism in their normal zero positions, thus relieving the indicating mechanism and particularly the spring 19 from strain after the weight of the ice has been initially indicated. The weight of the ice or water therefrom can be indicated at any time by releasing the latch 25 from the pin 22.

Referring now particularly to Figs. 5 and 7, it will be seen that I provide attached to the ice receptacle 4, a drip-pipe 26 passing downwardly through the bottom 27 of the refrigerator, and suspending a drip-pan or receptacle 28 having a cock 29 thereunder, so that the water from the receptacle 28 can be drawn off when desired.

It will be understood that the pipe 26 and receptacle 28 are suspended from and movable with the ice receptacle 4, in such manner that as the ice melts in the receptacle 4, the water therefrom collects in the drip receptacle 28 so that the weight as indicated by the dial-hand remains unchanged.

Referring now to Figs. 8 and 9, which illustrate an ice-box of the conventional type, the weighing mechanism is the same as previously described, except that the ice receptacle 30 rests directly upon the crank-shafts 6 instead of being suspended therefrom as previously described.

Having thus fully described the several parts of the invention, its operation will be obvious from the accompanying drawings taken in connection with the foregoing specification. While I have shown and described two embodiments of the invention (as in Figs. 3 and 9), I do not wish to be understood as limiting myself to these constructions and arrangements of parts, but I consider myself clearly entitled to all such changes and modifications as fall within the limit and scope of the appended claims:

1. In a device of the type described, the combination of a weighing receptacle, intermeshed segments, means connecting said weighing receptacle with said intermeshed segments in such manner that the segments are actuated by the weight of the receptacle contents, one of said intermeshed segments being of a relatively extended arc, a dial-hand equipped shaft intergeared with the arcuate extension of said extended segment beyond the other segment.

2. In a device of the type described, the combination of a weighing receptacle, means adapted to be actuated by the weight of the receptacle contents, said means including intermeshed segments, weight indicating mechanism including a shaft, one of said intermeshed segments being intergeared with said shaft to actuate said indicating mechanism.

3. In a device of the type described, the combination of a weighing receptacle, means adapted to be actuated by the weight of the receptacle contents, said means including two arms having intermeshed segments, indicating mechanism including a hand-equipped shaft, one of said intermeshed segments being of a relatively extended arc, said arc being intergeared with said shaft beyond the other segment, and means adapted to retain said indicating mechanism in its zero position.

4. In a device of the type described, the combination of a weighing receptacle, means adapted to provide for the movement of said receptacle as in weighing the contents thereof, a drain receiving receptacle and a tubular member having fixed connection between said weighing receptacle and said drain receiving receptacle and discharging into said latter receptacle to provide for the movement of said drain receiving receptacle with that of the weighing receptacle during the melting of the contents of the latter, and whereby the weight indication will remain unchanged.

5. In a device of the type described, the combination of a weighing receptacle, means adapted to provide for the movement of said receptacle as in weighing the contents thereof, a drain-receiving receptacle having fixed connection with said weighing receptacle, the whole arranged in such manner that the weight indication will remain unchanged.

In testimony whereof, I affix my signature, in presence of two witnesses.

OLAF TALLAKSEN.

Witnesses:
GRACE M. BOTTOMLEY,
CAGOT TALLAKSEN.